United States Patent
Swierk et al.

(10) Patent No.: US 9,329,833 B2
(45) Date of Patent: May 3, 2016

(54) VISUAL AUDIO QUALITY CUES AND CONTEXT AWARENESS IN A VIRTUAL COLLABORATION SESSION

(71) Applicant: Dell Products, L.P., Round Rock, TX (US)

(72) Inventors: Todd Swierk, Austin, TX (US); Michael S. Gatson, Austin, TX (US); Jason A. Shepherd, Austin, TX (US); Clifton J. Barker, Austin, TX (US); Yuan-Chang Lo, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 154 days.

(21) Appl. No.: 14/136,690

(22) Filed: Dec. 20, 2013

(65) Prior Publication Data

US 2015/0179186 A1    Jun. 25, 2015

(51) Int. Cl.
| | |
|---|---|
| *G10L 21/06* | (2013.01) |
| *G06F 3/16* | (2006.01) |
| *H04L 12/26* | (2006.01) |
| *H04M 3/22* | (2006.01) |
| *G10L 25/60* | (2013.01) |

(52) U.S. Cl.
CPC .............. *G06F 3/167* (2013.01); *G10L 25/60* (2013.01); *H04L 43/08* (2013.01); *H04M 3/2227* (2013.01); *H04L 43/12* (2013.01); *H04M 2203/352* (2013.01)

(58) Field of Classification Search
CPC ....... G10L 21/06; G10L 13/043; G10L 15/22; G10L 15/265; G10L 17/26; G10L 25/60; G06F 3/16; G09B 19/04; H05K 999/99; H04L 43/08; H04L 43/12; H04L 43/16; H04M 2203/352; H04M 3/2227
USPC ............ 704/276, E19.001, E19.002, 270, 23; 370/252, 260; 340/463; 348/180; 381/94.1, 94.2; 709/224, 207
See application file for complete search history.

(56) References Cited

U.S. PATENT DOCUMENTS

| | | | |
|---|---|---|---|
| 6,904,405 B2* | 6/2005 | Suominen ..................... 704/235 |
| 2005/0246165 A1* | 11/2005 | Pettinelli et al. .............. 704/207 |
| 2006/0031469 A1* | 2/2006 | Clarke et al. .................. 709/224 |
| 2007/0291108 A1* | 12/2007 | Huber et al. ............... 348/14.02 |
| 2011/0225247 A1* | 9/2011 | Anantharaman et al. ..... 709/206 |
| 2012/0116800 A1* | 5/2012 | McCallie et al. ................ 705/2 |

* cited by examiner

*Primary Examiner* — Vijay B Chawan
(74) *Attorney, Agent, or Firm* — Fogarty, L.L.C.

(57) ABSTRACT

Systems and methods for providing visual audio quality cues and context awareness in a virtual collaboration session. In some embodiments, a method may include receiving a plurality of audio signals, each audio signal captured from one of a plurality of a participants of a virtual collaboration session; determining, for each of the plurality of participants, a voice quality of the participant's audio signal; and providing a visual cue of the voice quality of each participant's audio signal to at least one of the plurality of participants.

20 Claims, 5 Drawing Sheets

US 9,329,833 B2

VISUAL AUDIO QUALITY CUES AND CONTEXT AWARENESS IN A VIRTUAL COLLABORATION SESSION

FIELD

This disclosure relates generally to computer systems, and more specifically, to systems and methods for providing visual audio quality cues and context awareness in a virtual collaboration session.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some situations, two or more IHSs may be operated by different users or team members participating in a "virtual collaboration session" or "virtual meeting." Generally speaking, "virtual collaboration" is a manner of collaboration between users that is carried out via technology-mediated communication. Although virtual collaboration may follow similar processes as conventional collaboration, the parties involved in a virtual collaboration session communicate with each other, at least in part, through technological channels.

In the case of an IHS- or computer-mediated collaboration, a virtual collaboration session may include, for example, audio conferencing, video conferencing, a chat room, a discussion board, text messaging, instant messaging, shared database(s), whiteboarding, wikis, application specific groupware, or the like. For instance, "whiteboarding" is the placement of shared images, documents, or other files on a shared on-screen notebook or whiteboard. Videoconferencing and data conferencing functionality may let users annotate these shared documents, as if on a physical whiteboard. With such an application, several people may be able to work together remotely on the same materials during a virtual collaboration session.

SUMMARY

Embodiments of systems and methods for providing visual audio quality cues and context awareness in a virtual collaboration session are described herein. In an illustrative, non-limiting embodiment, a method may include receiving a plurality of audio signals, each audio signal captured from one of a plurality of participants of a virtual collaboration session; determining, for each of the plurality of participants, a voice quality of the participant's audio signal; and providing a visual cue of the voice quality of each participant's audio signal to at least one of the plurality of participants.

In some implementations, the virtual collaboration session may include a conference call or a whiteboarding session, the voice quality may include a mean opinion score (MOS), and/or the voice quality may include a signal-to-noise ratio (SNR) measurement. The at least one of the plurality of participants may include a moderator or organizer of the virtual collaboration session. Also, the visual cue may include an icon, shape, or color indicative of the voice quality.

The method may also comprise determining that the voice quality of a given participant's corresponding audio signal fails to meets a threshold value and, in response to the determination, making a suggestion to the at least one of the plurality of participants that the given participant be muted during the virtual collaboration session.

The method may further comprise providing a visual cue of the voice quality of a given participant's audio signal to the given participant, where the visual cue includes an icon, shape, or color indicative of the voice quality, determining that the voice quality of the given participant's audio signal fails to meets a threshold value, and allowing the given participant to mute his or her microphone during the virtual collaboration session. In some cases, determining the voice quality of the participant's audio signal includes determining whether the audio signal includes a component not intended to be shared with other participants of the virtual collaboration session.

In another illustrative, non-limiting embodiment, a method may include receiving an audio signal captured from a participant of a virtual collaboration session and determining whether the audio signal includes a component not intended to be shared with other participants of the virtual collaboration session.

For example, the virtual collaboration session may include a conference call or a whiteboarding session. The component may include ambient noise in the participant's environment and/or the participant's spoken voice.

In some cases, determining whether the audio signal includes the component may include detecting a physical proximity of the participant to the IHS. Additionally or alternatively, determining whether the audio signal includes the component may include determining a head orientation of the participant. Additionally or alternatively, determining whether the audio signal includes the component further may include identifying a gesture made by the participant during the virtual collaboration session. Moreover, in response to a determination that the audio signal includes the component, the method may also include causing an instruction to be provided to another participant of the virtual collaboration session to mute the participant.

In yet another embodiment, a method may include receiving an audio signal captured from a participant of a virtual collaboration session, identifying at least one of: context of the audio signal or a gesture made by the participant during the virtual collaboration session, and modifying a manner in which the audio signal is provided to other participants of the virtual collaboration session based, at least in part, upon the context.

In some implementations, the gesture may include an at least partial covering of the participant's mouth with his or her hands and modifying the manner in which the audio signal is provided to the other participants may include muting the participant's audio signal. Additionally or alternatively, the gesture may include a cupped hand around the participant's ear, and modifying the manner in which the audio signal is provided to the other participants may include unmuting the participant's audio signal. In other implementations, identifying the context may include determining a quality of the participant's network connection, and modifying the manner in which the audio signal is provided to the other participants may include muting the participant's audio signal if the quality of the participant's network connection is below a threshold value.

In some embodiments, one or more of the techniques described herein may be performed, at least in part, by an Information Handling System (IHS) operated by a given one of a plurality of participants of a virtual collaboration session. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
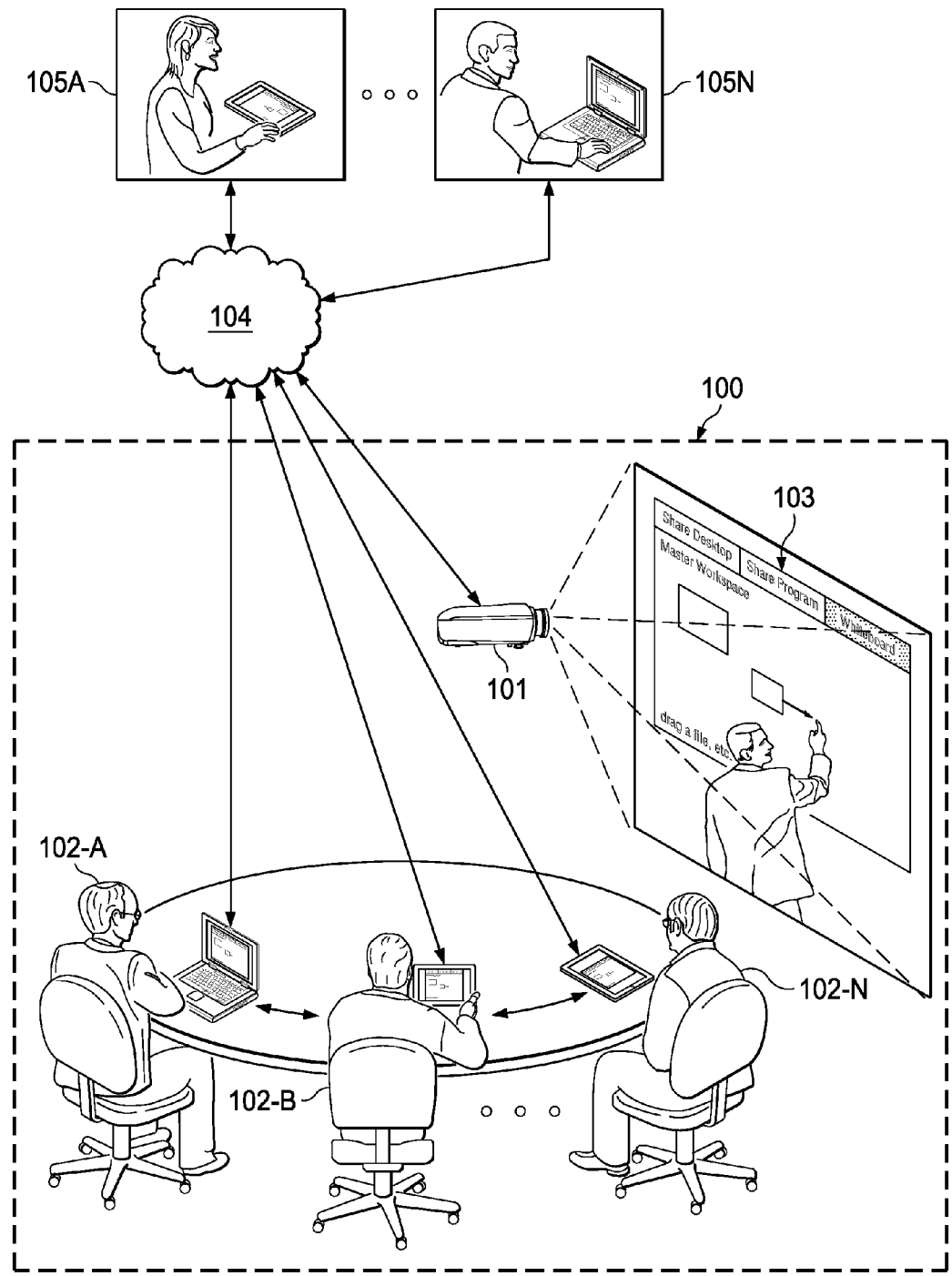
FIG. 1 is a diagram illustrating an example of an environment where systems and methods for providing visual audio quality cues and context awareness in a virtual collaboration session may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

Overview

The inventors hereof have recognized a need for new tools that enable better team interactions and improve effectiveness in the workplace, particularly as the workforce becomes more geographically-distributed and as the volume of business information created and exchanged increases to unprecedented levels. Existing tools intended to facilitate collaboration include digital whiteboarding, instant messaging, file sharing, and unified communication platforms. Unfortunately, such conventional tools are fragmented and do not adequately address certain problems specific to real-time interactions. In addition, these tools do not capitalize on contextual information for further gains in productivity and ease of use.

Examples of problems faced by distributed teams include the lack of a universally acceptable manner of performing whiteboarding sessions. The use of traditional dry erase boards in meeting rooms excludes or limits the ability of remote workers to contribute and current digital whiteboarding options are unnatural to use and are therefore not being adopted. In addition, there are numerous inefficiencies in setting up meeting resources, sharing in real-time, and distribution of materials after meetings such as emailing notes, presentation materials, and digital pictures of whiteboard sketches. Fragmentation across tool sets and limited format optimization for laptops, tablets, and the use of in-room projectors present a further set of issues. Moreover, the lack of continuity between meetings and desk work and across a meeting series including common file repositories, persistent notes and whiteboard sketches, and historical context can create a number of other problems and inefficiencies.

To address these, and other concerns, the inventors hereof have developed systems and methods that address, among other things, the setting up of resources for a virtual collaboration session, the taking of minutes and capture of whiteboard sketches, the creation and management to agendas, and/or provide the ability to have the right participants and information on hand for a collaboration session.

In some embodiments, these systems and methods focus on leveraging technology to increase effectiveness of real-time team interactions in the form of a "connected productivity framework." A digital or virtual workspace part of such a framework may include an application that enables both in-room and remote users the ability to interact easily with the collaboration tool in real-time. The format of such a virtual workspace may be optimized for personal computers (PCs), tablets, mobile devices, and/or in-room projection. The workspace may be shared across all users' personal devices, and it may provide a centralized location for presenting files and whiteboarding in real-time and from anywhere. The integration of context with unified communication and note-taking functionality provides improved audio, speaker identification, and automation of meeting minutes.

The term "context," as used herein, refers to information that may be used to characterize the situation of an entity. An entity is a person, place, or object that is considered relevant to the interaction between a user and an application, including the user and application themselves. Examples of context include, but are not limited to, location, people and devices nearby, and calendar events.

For instance, a connected productivity framework may provide, among other things, automation of meeting setup, proximity awareness for automatic joining of sessions, Natural User Interface (NUI) control of a workspace to increase the usability and adoption, intelligent information management and advanced indexing and search, and/or meeting continuity. Moreover, a set of client capabilities working in concert across potentially disparate devices may include: access to a common shared workspace with public and private workspaces for file sharing and real-time collaboration, advanced digital whiteboarding with natural input to dynamically control access, robust search functionality to review past work, and/or the ability to seamlessly moderate content flow, authorization, and intelligent information retrieval.

When certain aspects of the connected productivity framework described herein are applied to a projector, for instance, the projector may become a fixed point of reference providing contextual awareness. The projector may maintain a relationship to the room and associated resources (e.g., peripheral hardware). This allows the projector be a central hub for organizing meetings, and it does not necessarily rely on a host user and their device to be present for meeting and collaborating.

In some implementations, a cloud-hosted or enterprise service infrastructure as described herein may allow virtual collaboration session to be persistent. Specifically, once a document, drawing, or other content is used during a whiteboard session, for example, the content may be tagged as belonging to that session. When a subsequent session takes places that is associated with a previous session (and/or when the previous session is resumed at a later time), the content and transactions previously performed in the virtual collaboration environment may be retrieved so that, to participants, there is meeting continuity. In some embodiments, the systems and methods described herein may provide "digital video recorder" (DVR)-type functionality for collaboration sessions, such that participants may be able to record meeting events and play those events back at a later time, or "pause" the in-session content in temporary memory. The latter feature may enable a team to pause a meeting when they exceed the scheduled time and resume the in-session content in another available conference room, for example.

As will be understood by a person of ordinary skill in the art in light of this disclosure, virtually any commercial business setting that requires meeting or collaboration may implement one or more aspects of the systems and methods described herein. Additionally, aspects of the connected productivity framework described herein may be expanded to other areas, such as educational verticals for use in classrooms, or to consumers for general meet-ups.

Virtual Collaboration Architecture

Turning now to FIG. 1, a diagram illustrating an example of an environment where systems and methods for providing visual audio quality cues and context awareness in a virtual collaboration session may be implemented is depicted according to some embodiments. As shown, interactive collaboration tool 101 operates as a central meeting host and/or shared digital whiteboard for conference room 100 in order to enable a virtual collaboration session. In some embodiments, interactive collaboration tool may include (or otherwise be coupled to) a real-time communications server, a web server, an object store server, and/or a database. Moreover, interactive collaboration tool 101 may be configured with built-in intelligence and contextual awareness to simplify meeting setup and provide continuity between meetings and desk work.

In some implementations, for example, interactive collaboration tool 101 may include a video projector or any other suitable digital and/or image projector that receives a video signal (e.g., from a computer, a network device, or the like) and projects corresponding image(s) 103 on a projection screen using a lens system or the like. In this example, image 103 corresponds to a whiteboarding application, but it should be noted that any collaboration application may be hosted and/or rendered using tool 101 during a virtual collaboration session.

Any number of in-room participants 102A-N and any number of remote participants 105A-N may each operate a respective IHS or computing device including, for example, desktops, laptops, tablets, or smartphones. In a typical situation, in-room participants 102A-N are in close physical proximity to interactive collaboration tool 101, whereas remote participants 105A-N are located in geographically distributed or remote locations, such as other offices or their homes. In other situations, however, a given collaboration session may include only in-room participants 102A-N or only remote participants 105A-N.

With regard to participants 102A-N and 105A-N, it should be noted that users participating in a virtual collaboration session or the like may have different classifications. For example, a participant may include a member of the session. A moderator may be an owner of the meeting workspace and leader that moderates the participants of the meeting. Often the moderator has full control of the session, including material content, what is displayed on the master workspace, and the invited list of participants. Moreover, an editor may include a meeting participant or the moderator who has write privileges to update content in the meeting workspace.

Interactive collaboration tool 101 and participants 102A-N and 105A-N may include any end-point device capable of audio or video capture, and that has access to network 104. In various embodiments, telecommunications network 104 may include one or more wireless networks, circuit-switched networks, packet-switched networks, or any combination thereof to enable communications between two or more of IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Figure 2:
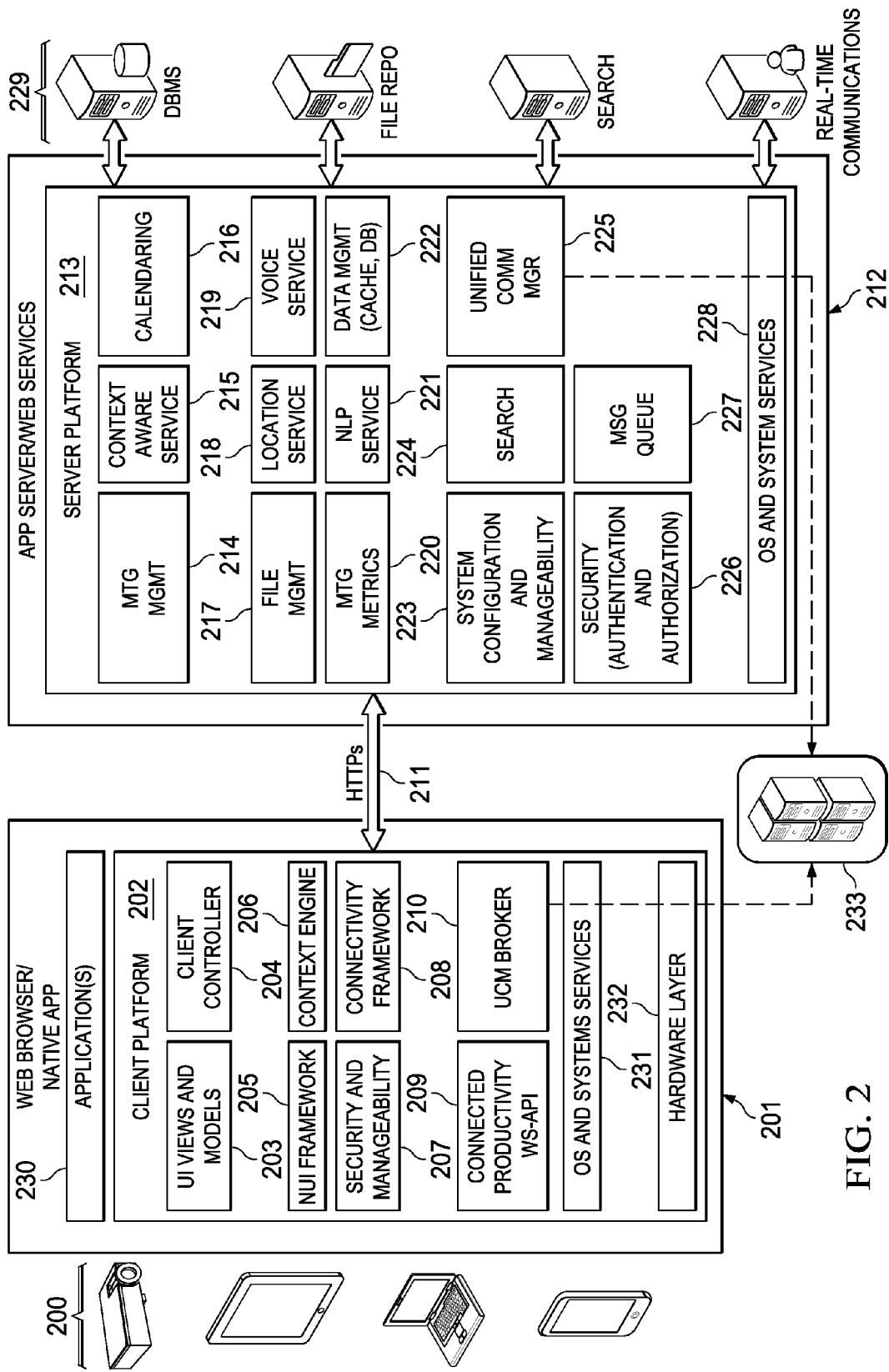
FIG. 2 is a block diagram of a cloud-hosted or enterprise service infrastructure for providing visual audio quality cues and context awareness in a virtual collaboration session according to some embodiments.

FIG. 2 is a block diagram of a cloud-hosted or enterprise service infrastructure. In some embodiments, the infrastructure of FIG. 2 may be implemented in the context of environment of FIG. 1 for providing visual audio quality cues and context awareness in a virtual collaboration session. Particularly, one or more participant devices 200 (operated by in-room participants 102A-N and/or remote participants 105A-N) may be each configured to execute client platform 202 in the form of a web browser or native application 201. As such, on the client side, one or more virtual collaboration application(s) 230 (e.g., a whiteboarding application or the like) may utilize one or more of modules 203-210, 231, and/or 232 to perform one or more virtual collaboration operations. Application server or web services 212 may contain server platform 213, and may be executed, for example, by interactive collaboration tool 101.

As illustrated, web browser or native application 201 may be configured to communicate with application server or web services 212 (and vice versa) via link 211 using any suitable protocol such as, for example, Hypertext Transfer Protocol (HTTP) or HTTP Secure (HTTPS). Each module within client platform 202 and application server or web services 212 may be responsible to perform a specific operation or set of operations within the collaborative framework.

Particularly, client platform 202 may include user interface (UI) view & models module 203 configured to provide a lightweight, flexible user interface that is portable across platforms and device types (e.g., web browsers in personal computers, tablets, and phones using HyperText Markup Language (HTML) 5, Cascading Style Sheets (CSS) 3, and/or JavaScript). Client controller module 204 may be configured to route incoming and outgoing messages accordingly based on network requests or responses. Natural User Interface (NUI) framework module 205 may be configured to operate various hardware sensors for touch, multi-point touch, visual and audio provide the ability for voice commands and gesturing (e.g., touch and 3D based). Context engine module 206 may be configured to accept numerous inputs such as hardware sensor feeds and text derived from speech. In some instances, context engine module 206 may be configured to perform operations such as, for example, automatic participant identification, automated meeting joining and collaboration via most effective manner, location aware operations (e.g., geofencing, proximity detection, or the like) and associated management file detection/delivery, etc.

Client platform 202 also includes security and manageability module 207 configured to perform authentication and authorization operations, and connectivity framework module 208 configured to detect and connect with other devices (e.g., peer-to-peer). Connected productivity module 209 may be configured to provide a web service API (WS-API) that allows clients and host to communicate and/or invoke various actions or data querying commands. Unified Communication (UCM) module 210 may be configured to broker audio and video communication including file transfers across devices and/or through third-party systems 233.

Within client platform 202, hardware layer 232 may include a plurality of gesture tracking (e.g., touchscreen or camera), audio and video capture (e.g., camera, microphone, etc.), and wireless communication devices or controllers (e.g., Bluetooth®, WiFi, Near Field Communications, or the like). Operating system and system services layer 231 may have access to hardware layer 232, upon which modules 203-210 rest. In some cases, third-party plug-ins (not shown) may be communicatively coupled to virtual collaboration application 230 and/or modules 203-210 via an Application Programming Interface (API).

Server platform 213 includes meeting management module 214 configured to handle operations such as, for example, creating and managing meetings, linking virtual workspace, notifying participants of invitations, and/or providing configuration for auto calling (push/pull) participants upon start of a meeting, among others. Context aware service 215 may be configured to provide services used by context engine 206 of client platform 202. Calendaring module 216 may be configured to unify participant and resource scheduling and to provide smart scheduling for automated search for available meeting times.

Moreover, server platform 213 also includes file management module 217 configured to provide file storage, transfer, search and versioning. Location service module 218 may be configured to perform location tracking, both coarse and fine grained, that relies on WiFi geo-location, Global Positioning System (GPS), and/or other location technologies. Voice service module 219 may be configured to perform automated speech recognition, speech-to-text, text-to-speech conversation and audio archival. Meeting metrics module 220 may be configured to track various meeting metrics such as talk time, topic duration and to provide analytics for management and/or participants.

Still referring to server platform 213, Natural Language Processing (NLP) service module 221 may be configured to perform automatic meeting summation (minutes), conference resolution, natural language understanding, named entity recognition, parsing, and disambiguation of language. Data management module 222 may be configured to provide distributed cache and data storage of application state and session in one or more databases. System configuration & manageability module 223 may provide the ability to configure one or more other modules within server platform 213. Search module 224 may be configured to enable data search operations, and UCM manager module 225 may be configured to enable operations performed by UCM broker 210 in conjunction with third-party systems 233.

Security (authentication & authorization) module 226 may be configured to perform one or more security or authentication operations, and message queue module 227 may be configured to temporarily store one or more incoming and/or outgoing messages. Within server platform 213, operating system and system services layer 228 may allow one or more modules 214-227 to be executed.

In some embodiments, server platform 213 may be configured to interact with a number of other servers 229 including, but not limited to, database management systems (DBMSs), file repositories, search engines, and real-time communication systems. Moreover, UCM broker 210 and UCM manager 225 may be configured to integrate and enhance third-party systems and services (e.g., Outlook®, Gmail®, Dropbox®, Box.net®, Google Cloud®, Amazon Web Services®, Salesforce®, Lync®, WebEx®, Live Meeting®) using a suitable protocol such as HTTP or Session Initiation Protocol (SIP).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
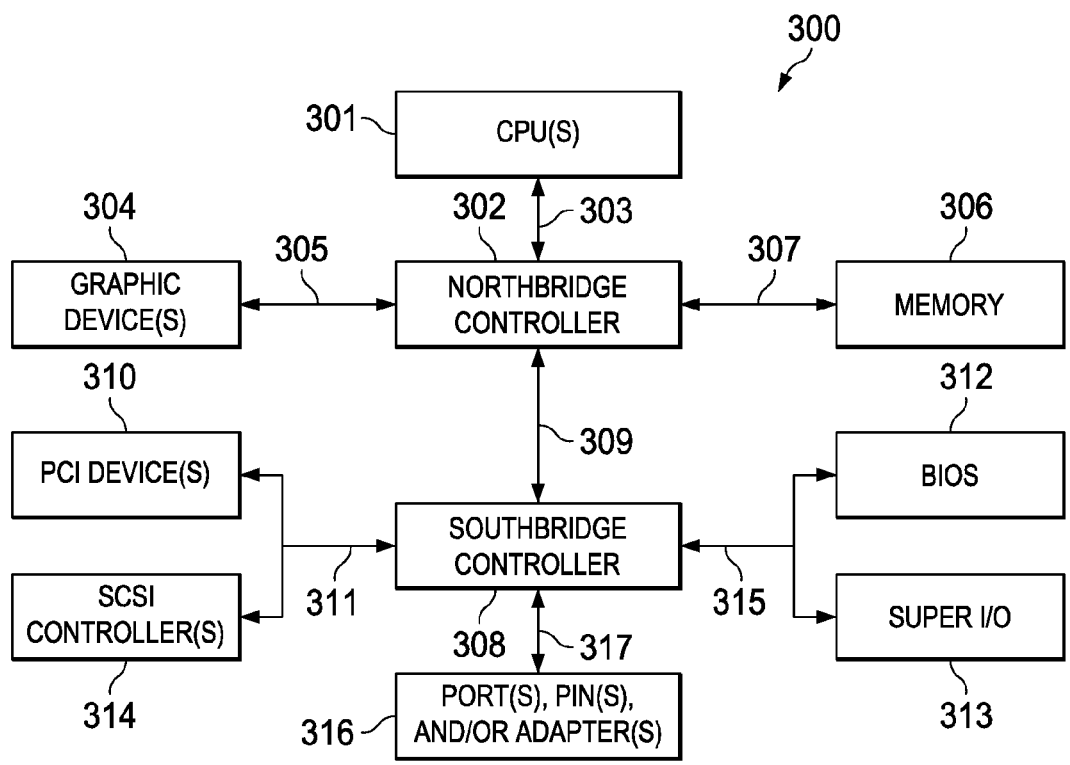
FIG. 3 is a block diagram of an example of an Information Handling System (IHS) according to some embodiments.

FIG. 3 is a block diagram of an example of an IHS. In some embodiments, IHS 300 may be used to implement any of computer systems or devices 101, 102A-N, and/or 105A-N. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

Virtual Collaboration Application

In various embodiments, the virtual collaboration architecture described above may be used to implement a number of systems and methods in the form of virtual collaboration application 230 shown in FIG. 2. These systems and methods may be related to meeting management, shared workspace (e.g., folder sharing control, remote desktop, or application sharing), digital whiteboard (e.g., collaboration arbitration, boundary, or light curtain based input recognition), and/or personal engagement (e.g., attention loss detection, eye tracking, etc.), some of which are summarized below and explained in more detail in subsequent section(s).

For example, virtual collaboration application 230 may implement systems and/or methods for managing public and private information in a collaboration session. Both public and private portions of a virtual collaboration workspace may be incorporated into the same window of a graphical user interface. Meeting/project content in the public and private portions may include documents, email, discussion threads, meeting minutes, whiteboard drawings, lists of participants and their status, and calendar events. Tasks that may be performed using the workspace include, but are not limited to, editing of documents, presentation of slides, whiteboard drawing, and instant messaging with remote participants.

Additionally or alternatively, virtual collaboration application 230 may implement systems and/or methods for real-time moderation of content sharing to enable the dynamic moderating of participation in a shared workspace during a meeting. Combining a contact list alongside the shared workspace and folder system in one simplified and integrated User Interface (UI) puts all input and outputs in one window so users simply drag and drop content, in-session workspace tabs, and people to and from each other to control access rights and share. Behavior rules dictating actions may be based on source and destination for drag and drop of content and user names. Actions may differ depending on whether destination is the real-time workspace or file repository. Also, these systems and methods provide aggregation of real-time workspace (whiteboard/presentation area) with file repository and meeting participant lists in one UI.

Additionally or alternatively, virtual collaboration application 230 may implement systems and/or methods for correlating stroke drawings to audio. Such systems and methods may be configured to correlate participants' audio and drawing input by synchronization of event triggers on a given device(s). As input is received (drawing, speech, or both), the data are correlated via time synchronization, packaged together, and persisted on a backend system, which provides remote synchronous and asynchronous viewing and playback features for connected clients. The data streams result in a series of layered inputs that link together the correlated audio and visual (sketches). This allows participants to revisit previous collaboration settings. Not only can a user playback the session in its entirety, each drawing layer and corresponding audio can be reviewed non-linearly.

Additionally or alternatively, virtual collaboration application 230 may implement systems and/or methods for live speech-to-text broadcast communication. Such systems and methods may be configured to employ Automatic Speech Recognition (ASR) technology combined with a client-server model and in order to synchronize the converted speech's text transcript for real-time viewing and later audio playback within a scrolling marquee (e.g., "news ticker"). In conjunction with the converted speech's text the audio data of the speech itself is persisted on a backend system, it may provide remote synchronous and asynchronous viewing and playback features for connected clients.

Additionally or alternatively, virtual collaboration application 230 may implement systems and/or methods for dynamic whiteboarding drawing area. In some cases, a virtual border may be developed around the center of a user's cursor as soon as that user starts to draw in a shared whiteboard space. The border may simulate the physical space that the user would block in front of a traditional wall-mounted whiteboard and is represented to all session participants as a color-coded shaded area or outline, for example. It provides dynamic virtual border for reserving drawing space with automatic inactivity time out and resolution with other borders, as well as moderation control of a subset of total available area, allowing border owner to invite others to draw in their temporary space, and the ability to save subsets of a digital whiteboard for longer periods of time.

Additionally or alternatively, virtual collaboration application 230 may implement systems and/or methods for coaching users on engagement in meetings and desk work. These systems and methods may be configured to measure a user's activity and to feedback relevant information regarding their current level of engagement. Sensors may detect activity including facial movements, gestures, spoken audio, and/or application use. Resulting data may be analyzed and ranked with priority scores to create statistics such as average speaking time and time spent looking away from screen. As such, these systems and methods may be used to provide contextual feedback in a collaborative setting to monitor and to improve worker effectiveness, ability to set goals for improvement over time, such as increased presence in meetings and reduced time spent on low-priority activities, combined monitoring of device and environmental activity to adapt metrics reported based on user's context, and ability for user to extend to general productivity improvement.

Additionally or alternatively, virtual collaboration application 230 may implement systems and/or methods for automated tracking of meeting behavior and optimization over time. Such systems and methods may act as a planning tool configured to leverage device sensors, user calendars, and/or note-taking applications to track user behavior in meetings and suggest optimizations over time to increase overall effectiveness. As such, these systems and methods may leverage device proximity awareness to automatically track user attendance in scheduled meetings over time and/or use ASR to determine participation levels and mood of meetings (e.g., assess whether attendance is too high, too low, and general logistics).

Additionally or alternatively, virtual collaboration application 230 may implement systems and/or methods for managing meeting or meeting topic time limits in a distributed environment. A meeting host service may provide controlled timing and notification of meeting events through use of contextual information such as speaker identification, key word tracking, and/or detection of meeting participants through proximity. Meeting host and individual participants may be notified of time remaining prior to exceeding time limits. Examples include, but are not limited to, time remaining for (current) topic and exceeding preset time-to-talk limit. In some cases, these systems and methods may be configured to perform aggregation of contextual data with traditional calendar, contact, and agenda information to create unique meeting events such as identifying participants present at start and end of meeting (e.g., through device proximity). Such systems and methods may also be configured to use of contextual data for dynamic management of meeting timing and flow in a distributed environment, and to provide contextual-based feedback mechanism to individuals such as exceeding preset time-to-talk.

Additionally or alternatively, virtual collaboration application 230 may implement systems and/or methods for enhanced trust relations based on peer-to-peer (P2P) direct communications. In many situations people whom have not met in person may be in communication with each other via email, instant messages (IMs), and through social media. With the emerging P2P direct communications, face-to-face communication may be used as an out-of-band peer authentication ("we have met"). By attaching this attribute in a user's contact list, when the user is contacted by other people whose contact information indicates that they have interacted face-to-face, these systems and methods may provide the user a higher level of trust.

Additionally or alternatively, virtual collaboration application 230 may implement systems and/or methods for a gesture enhanced interactive whiteboard. Traditional digital whiteboard uses object size and motion to detect if a user intending to draw on the board or erase a section of the board. This feature can have unintended consequences, such as interpreting pointing as drawing. To address this, and other concerns, these systems and methods may augment the traditional whiteboard drawing/erase detection mechanism, such as light curtain, with gesture recognition system that can track the user's face orientation, gaze and/or wrist articulation to discern user intent.

Additionally or alternatively, virtual collaboration application 230 may implement systems and/or methods for hand raise gesture to indicate needing turn to speak. It has become very commonplace to have remote workers who participate in conference call meetings. One key pain point for remote workers is letting others know that they wish to speak, especially if there are many participants engaged in active discussion in a meeting room with a handful or few remote workers on the conference call. Accordingly, these systems and methods may interpret and raise gesture that is detected by a laptop web cam as automatically indicating to meeting participants that a remote worker needs or wants a turn to speak.

Additionally or alternatively, virtual collaboration application 230 may implement systems and/or methods for providing visual audio quality cues for conference calls. One key pain point anyone who has attended conference calls can attest to is poor audio quality on the conference bridge. More often than not, this poor audio experience is due to background noise introduced by one (or several) of the participants. It is often the case that the specific person causing the bridge noise is at the same time not listening to even know they are causing disruption of the conference. Accordingly, these systems and methods may provide a visual cue of audio quality of speaker (e.g., loudness of speaker, background noise, latency, green/yellow/red of Mean opinion score (MOS)), automated identification of noise makers (e.g., moderator view and private identification to speaker), and/or auto muting/filtering of noise makers (e.g., eating sounds, keyboard typing, dog barking, baby screaming).

Visual Audio Quality Cues and Context Awareness in a Virtual Collaboration Session The workplace has been evolving to become more distributed than ever. It has become very commonplace for a wide spectrum of meetings to include at least one participant joining via a conference call or other virtual collaboration system (e.g., whiteboarding session, etc.). In many instances, because of geography and travel costs, large group meetings are conducted virtually via conference call. A problem with conference calls is the poor audio quality on the conference bridge. More often than not, this poor audio experience is due to background or ambient noise introduced by one (or several) of the calls' participants. It is often the case that the specific person causing the bridge noise is at the same time not listening to even know they are causing disruption of the conference.

To address these concerns, the inventors hereof have developed systems and methods for providing the conference bridge owner (e.g., a moderator or coordinator) and/or other participants of a virtual collaboration session with visual cues of audio quality and/or context awareness. In some embodiments, these systems and methods may allow a conference call moderator to visually see via audio cues which participant(s) is/are introducing any possible noise, and may give the moderator the ability to address the problem manually (e.g., by muting an offending participant) if need be. Additionally or alternatively, these systems and methods may also provide each participant a visual cue of their own audio quality and may include alerts, for example, if participants are introducing noise into the conference call, as well as suggestions to be made to improve a participant's voice quality (including auto-muting and muting functions). Additionally or alternatively, sensors and contextual data may be used to help participants manage noise and other undesirable sounds introduced into a conference call or collaboration session.

In some implementations, a visual cue of audio quality of a speaker may represent a speaker's loudness, background noise, latency, mean opinion score ("MOS score"), signal-to-noise ratio (SNR), or the like. In other implementations, the systems and methods described herein may provide an automated identification of noise makers (moderator view of conference participants and private identification to individual participants), as well as auto muting based on physical participant and sensor, gesture, and/or contextual cues.

To provide visual audio cues for virtual collaboration session and context awareness for improving audio experience on those sessions, a number of modules shown in FIG. 2 may be used. For example, context aware service module 215, voice service module 219, unified communication manager 225, UCM broker 210, context engine 206, NUI framework 205, voice conferencing application 230, and/or hardware layer 232 (sensors for context) may be used together to perform some of the operations described below.

Figure 4:
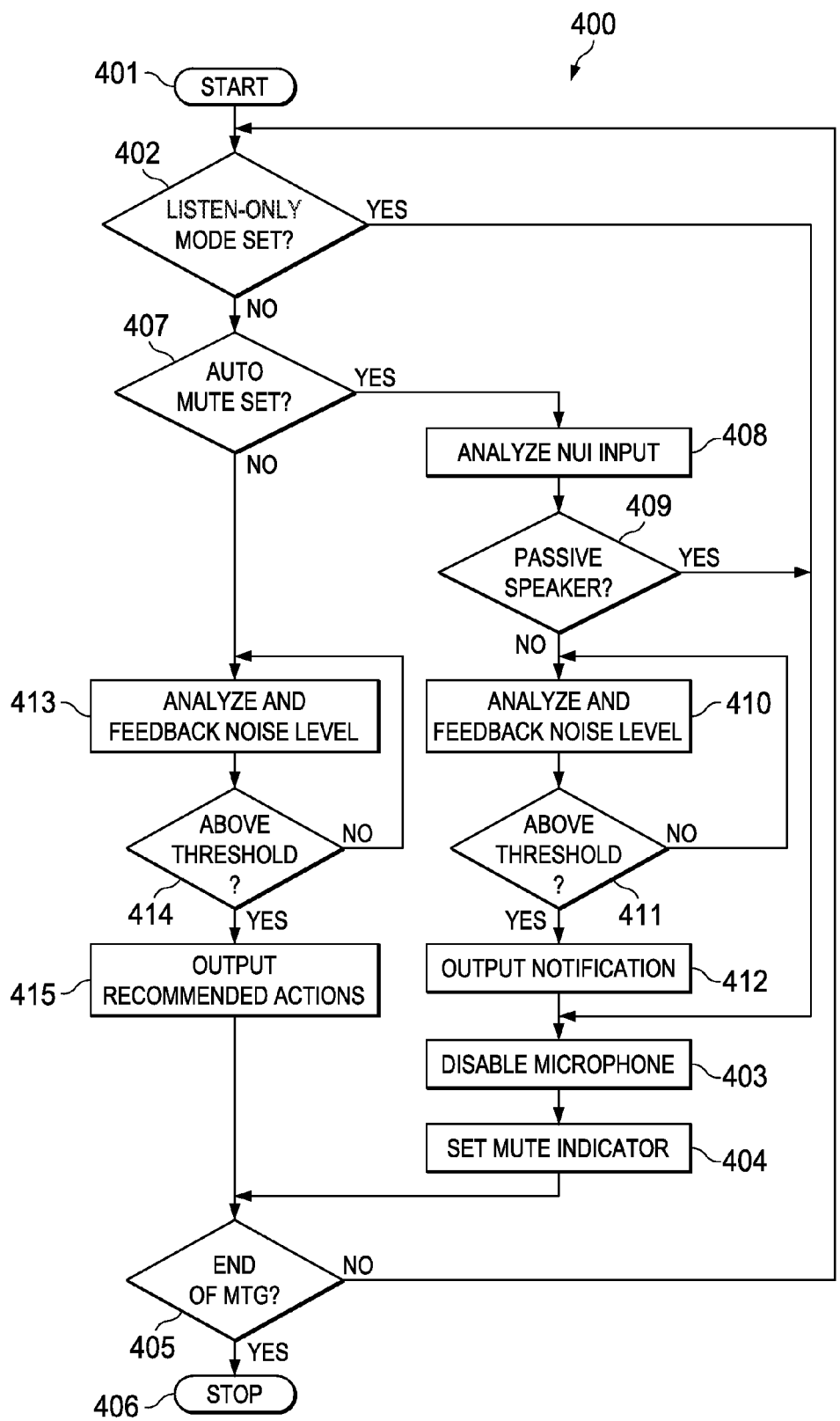
FIG. 4 is a flowchart of a method for providing visual audio quality cues and context awareness in a virtual collaboration session according to some embodiments.

Turning to FIG. 4, a method for providing visual audio quality cues and context awareness in a virtual collaboration session is depicted. In some embodiments, method 400 starts at block 401 at the beginning or prior to the beginning of a virtual collaboration session. At block 402, method 400 determines whether listen-only mode has been set. When a participant selects to join a session using the listen-only mode, he or she is able to hear audio signals captured and transmitted by other participants' IHSs, but cannot provide their own verbal contribution during the session. In some cases, whether or not the listen-only mode has been activated may be beyond a given participant's control and may have been set, for example, by a session moderator. Either way, if block 402 determines that the participant has selected listen-only mode, the participant's microphone is disabled at block 403 and a mute indicator is set at block 404. Block 405 determines if or when the virtual collaboration session has reached its end, and method 400 stops at block 406.

Returning to block 402, if method 400 determines that listen-only mode has not been set, block 407 determines whether an auto mute feature has been set. In some cases, the auto mute feature automatically mutes a participant's audio signal if the quality of that signal is such that it does not meet minimum requirements for the session. If the auto mute feature has not been set, method 400 analyzes and provides feedback to a given participant about the quality of his or her audio signal such as, for example, his or her noise level, voice quality, or the like. In some cases, such feedback may be provided in the form of a visual cue in a graphical user interface presented to the participant during the session. If block 414 determines that the noise level or voice quality is above a selected threshold value, control returns to block 413. Otherwise method 400 outputs one or more recommended actions to the participant at block 415, and control passes to block 405.

Examples of recommendations include, but are not limited to, an instruction that the participant approach or move closer to his or her microphone, that the participant mute his or her microphone, that the participant disconnect from the session (at least temporarily), that the participant find a quieter location to connect from, that the participant increase his or her microphone gain, etc. When the recommendation is presented to a moderator in response to the threshold value having been overcome for a given participant, method 400 may instruct the moderator to mute that given participant, contact the given participant via text or other messaging system to communicate the problem to him or her without disrupting the session, or disconnect the given participant from the session (temporarily or permanently).

Returning to block 407, if method 400 determines that the auto mute feature has been set, block 408 may analyze any inputs received at NUI framework module 205. In some embodiments, NUI framework 205 may be configured to identify a number of predetermined gestures made by a participant. For example, if the participant gestures to become a passive participant, as determined by block 409, control passes to block 403. Otherwise, at block 410, method 400 analyzes and provides feedback to a given participant about the quality of his or her audio signal. If block 411 determines that the quality of the audio signal is not above a preselected threshold value, the control returns to block 410. Otherwise method 400 may output a notification and/or recommendation to the participant at block 412, and control again passes to block 403.

In various implementations, a graphical user interface presented to session moderator during execution of method 400 may provide that moderator with the ability to see each participant's ambient noise level, voice quality, or audio signal quality via visual cues. Using the same graphical interface, the moderator may be given the ability to mute the microphone of a given participant on the conference bridge if they determine that the given participant is introducing unwanted noise. The moderator may also have the ability to see their own visual audio cues and be able to mute both their microphone and speaker/headset. In contrast with moderator controls, the graphical user interface presented to each participant may have a view of their own noise level, voice quality, and controls over their own microphone and/or speakers. Moreover, in some implementations, controls may be provided to moderator that enable him or her to activate global mute for all noise makers, which may be fewer than all participants of an ongoing session in some cases, rather than having to search through a list for the offenders individually.

Still referring to FIG. 4, block 408 may be configured to implement context awareness for virtual collaboration sessions. Particularly, sensor or gesture inputs received by NUI framework 205 may be used to provide feedback on auto-muting and action pop ups/alerts to the moderator and/or participants based on physical gestures. Examples of gesture inputs via NUI detection that may be used to detect a participant's intent to switch between listen-only mode and active speaking may include, but are not limited to, 2D or 3D camera configured to determine whether the participant is looking away from his or her computer screen (e.g., monitoring head orientation), whether the participant has made a "shoosh" gesture (finger to lips) or covered his or her mouth with their hand to mute, and whether the participant has cupped his or her hand(s) around their ear(s) to indicate unmute or increase volume, among others.

Meanwhile, examples of context input that may be assessed by context engines 206 and/or 215 and used to determine whether to sign a participant onto a virtual collaboration session in listen-only or active speaking mode, and/or to provide feedback on auto-muting and action pop ups/alerts to the moderator and/or participants include, but are not limited to, a location from which a participant connecting from (e.g., a moving vehicle or a fixed location, etc.), a type of device used by the participant (e.g., a mobile device or a desktop computer, etc.), a type of connection (e.g., wireless or wired connection, broadband or narrowband connection), and a type of microphone or speaker apparatus being used (e.g., built-in microphone or headset).

In some embodiments, a decision engine may be used (e.g., an artificial neural network or any other suitable algorithm) for determining if a component of an audio signal captured from a given participant is intended, by the given participant, to be heard by or shared with other participants. Examples of components include ambient noise (human, animal, or mechanical), and in some cases may also have been purposefully generated by the participant, including spoken conversations not relevant to the virtual collaboration session (e.g., with another person in physical proximity with the participant, on another phone or line, etc.). Moreover, examples of contextual features that may be used to determine user intent include the physical proximity of the participant to his or her computer or device, the he ad orientation of the participant, whether the sound is the participant's spoken voice, whether detected keywords are related to the collaboration session, etc.

In some cases, when method 400 determines (for example, as probability above certain threshold value) that the participant does not intend for the sound to be heard by other participants, an instruction or warning may be generated and transmitted or displayed to the participant and/or to the moderator. If the participant does mute his or her microphone manually in response to the instruction, the participant's action may then be fed back to the algorithm of the decision engine to improve accuracy through self-learning.

Figure 5:
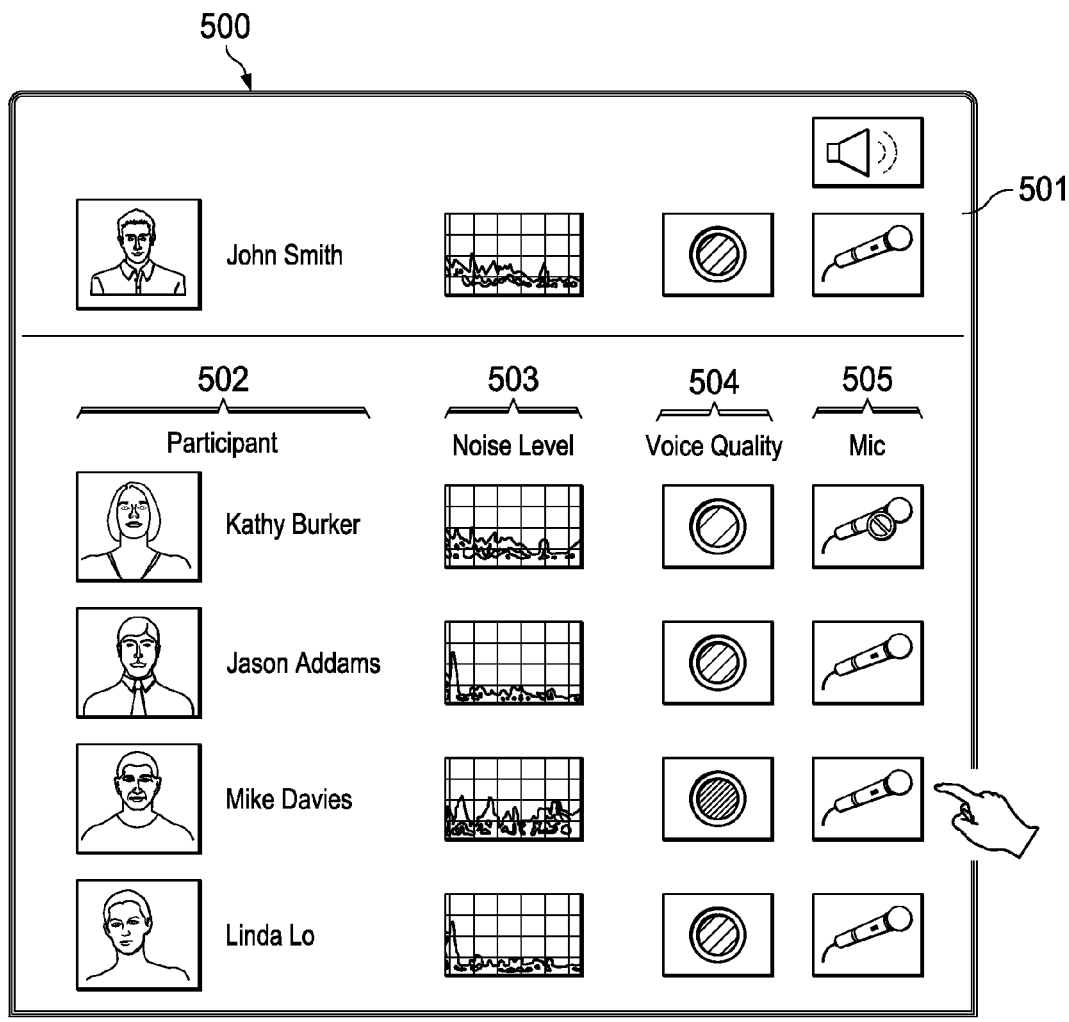
FIG. 5 is a screenshot illustrating an example of a moderator's graphical user interface according to some embodiments.

FIG. 5 is a screenshot illustrating an example of a moderator's graphical user interface 500 according to some embodiments. Here, moderator "John Smith" 501 is able to visually see the audio contributions of each of participants 502 during a virtual collaboration session, such as a conference call or a whiteboarding session, for example. Particularly, moderator 501 is provided information about each of participant 502's ambient noise level 503 in the form of dynamic graph conveying all sound components heard from that participant's microphone.

Moderator 501 is also provided a visual cue of each of participant 502's voice quality, distilled in this figure to a first pattern (or the color red, indicating the quality is below a low threshold value), a second pattern (or the color yellow, indicating the quality is between the low threshold value and a threshold value), and a third pattern (or the color green indicating the voice quality is above the high threshold value. In addition, moderator 501 is further provided control over the status of each of participant 502's microphones 505, or at least over whether the audio signal received from each of participants 502 is shared with other participants during the session.

By using interface 500, moderator 501 has the ability to mute the mic of any participant on a conference bridge, for example, if moderator 501 sees that a particular participant is introducing unwanted noise during the session. In FIG. 5 the moderator is going to mute Mike Davies by pressing the mic button with his finger. For example, moderator 501 may visually determine that "Mike's" connection is active by his respective dynamic noise level meter 503, and may also see that his voice quality indicator 504 is "red" flagging bad or poor voice quality on that connection. In addition, moderator 501 may have the ability to see his or her own visual audio cues, and mute both their microphone and/or speaker/headset.

Figure 6:
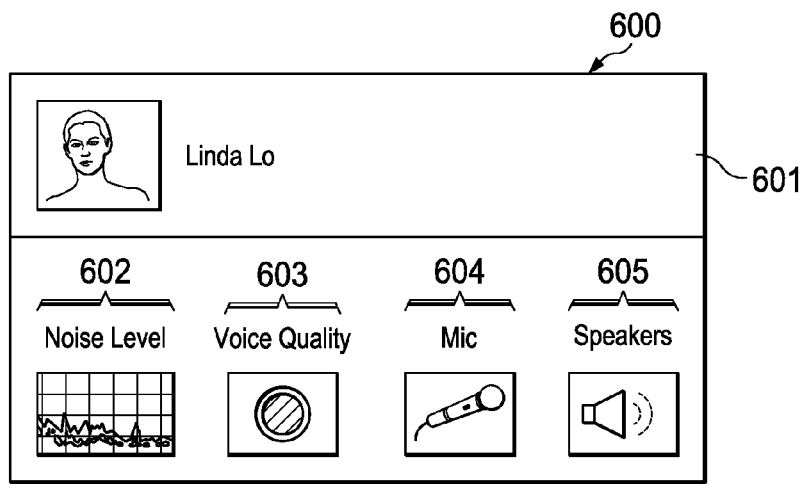
FIG. 6 is a screenshot illustrating an example of a participant's graphical user interface according to some embodiments.

FIG. 6 is a screenshot illustrating an example of a participant's graphical user interface 600 according to some embodiments. In contrast with interface 500, here participant 601 is provided with a visual representation of her own noise level 602, voice quality 603, and controls over the microphone 604 and speakers 605. As such, participant 601 may be able to control her own microphone and speakers, but not necessarily those of other participants.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory including program instructions stored thereon that, upon execution by the processor, cause the IHS to:
receive a plurality of audio signals, each audio signal captured from one of a plurality of participants of a virtual collaboration session;
determine, for each of the plurality of participants, a voice quality of the participant's audio signal;
provide a visual cue of the voice quality of each participant's audio signal to at least one of the plurality of participants;
determine that a given participant's audio signal includes a component not intended to be shared with other participants of the virtual collaboration session;
provide a warning to the given participant; and
use a given participant's action in response to the warning as part of a self-learning process.

2. The IHS of claim 1, wherein the virtual collaboration session includes a conference call or a whiteboarding session.

3. The IHS of claim 1, wherein the voice quality includes a mean opinion score (MOS).

4. The IHS of claim 1, wherein the voice quality includes a signal-to-noise ratio (SNR) measurement.

5. The IHS of claim 1, wherein the at least one of the plurality of participants includes a moderator or organizer of the virtual collaboration session.

6. The IHS of claim 1, wherein the visual cue includes an icon, shape, or color indicative of the voice quality.

7. The IHS of claim 1, wherein the program instructions, upon execution by the processor, further cause the IHS to:
determine that the voice quality of the given participant's corresponding audio signal fails to meets a threshold value; and
in response to the determination, make a suggestion to the at least one of the plurality of participants that the given participant be muted during the virtual collaboration session.

8. The IHS of claim 1, wherein the program instructions, upon execution by the processor, further cause the IHS to:
provide a visual cue of the voice quality of the given participant's audio signal to the given participant, wherein the visual cue includes an icon, shape, or color indicative of the voice quality, and wherein the audio signal is captured using a microphone;
determine that the voice quality of the given participant's audio signal fails to meets a threshold value; and
allow the given participant to mute the microphone during the virtual collaboration session.

9. The IHS of claim 1, wherein the warning is provided to the given participant using a communication medium distinct from the virtual collaboration session.

10. A method, comprising:
receiving, at an Information Handling System (IHS), an audio signal captured from a participant of a virtual collaboration session, wherein the virtual collaboration session includes a conference call or a whiteboarding session; and
determining whether the audio signal includes a component not intended to be shared with other participants of the virtual collaboration session;
providing a muting instruction to the participant; and
using a participant's manual muting of a microphone in response to the instruction as part of a self-learning process.

11. The method of claim 10, further comprising providing the muting instruction using a communication medium distinct from the virtual collaboration session.

12. The method of claim 10, wherein the component includes ambient noise in the participant's environment.

13. The method of claim 10, wherein the component includes the participant's spoken voice.

14. The method of claim 10, wherein determining whether the audio signal includes the component further comprises detecting a physical proximity of the participant to the IHS.

15. The method of claim 10, wherein determining whether the audio signal includes the component further comprises determining a head orientation of the participant.

16. The method of claim 10, wherein determining whether the audio signal includes the component further comprises identifying a gesture made by the participant during the virtual collaboration session.

17. The method of claim 10, further comprising in response to a determination that the audio signal includes the component, causing an instruction to be provided to another participant of the virtual collaboration session to mute the participant.

18. A non-transitory computer-readable medium having program instructions stored thereon that, upon execution by an Information Handling System (IHS), cause the IHS to:
receive an audio signal captured from a participant of a virtual collaboration session;
identify at least one of: context of the audio signal or a gesture made by the participant during the virtual collaboration session;
modify a manner in which the audio signal is provided to other participants of the virtual collaboration session based, at least in part, upon the context
determine that the participant's audio signal includes a component not intended to be shared with other participants of the virtual collaboration session;
provide a message to the participant using a communication medium distinct from the virtual collaboration session; and
use a participant's action in response to the message as part of a self-learning process.

19. The non-transitory computer-readable medium of claim 18, wherein the gesture includes an at least partial covering of the participant's mouth with his or her hands, and to modify the manner in which the audio signal is provided to the other participants, the program instructions, upon execution by the IHS, further cause the IHS to mute the participant's audio signal; or wherein the gesture includes a cupped hand around the participant's ear, and to modify the manner in which the audio signal is provided to the other participants, the program instructions, upon execution by the IHS, further cause the IHS to unmute the participant's audio signal.

20. The non-transitory computer-readable medium of claim 18, wherein to identify the context, the program instructions, upon execution by the IHS, further cause the IHS to determine a quality of the participant's network connection, and to modify the manner in which the audio signal is provided to the other participants, the program instructions, upon execution by the IHS, further cause the IHS to mute the participant's audio signal if the quality of the participant's network connection is below a threshold value.

* * * * *